United States Patent
Kosht et al.

(10) Patent No.: US 7,146,862 B2
(45) Date of Patent: Dec. 12, 2006

(54) THICK FILM STRAIN GAGE SENSOR

(75) Inventors: Danial L. Kosht, Gaylord, MI (US); Reza Oboodi, Morris Plains, NJ (US); James Piascik, Randolph, NJ (US); Joseph M. Walling, Boyne City, MI (US)

(73) Assignee: Honeywell International Inc., Morristown, NJ (US)

( * ) Notice: Subject to any disclaimer, the term of this patent is extended or adjusted under 35 U.S.C. 154(b) by 51 days.

(21) Appl. No.: 10/860,731

(22) Filed: Jun. 2, 2004

(65) Prior Publication Data

US 2005/0268726 A1 Dec. 8, 2005

(51) Int. Cl.
*G01B 7/16* (2006.01)
(52) U.S. Cl. ........................................................ 73/777
(58) Field of Classification Search .................. 73/777
See application file for complete search history.

(56) References Cited

U.S. PATENT DOCUMENTS 3,841,150 A * 10/1974 Pearson ........................ 73/766
5,410,908 A * 5/1995 Erichsen ..................... 73/31.05
2002/0032403 A1* 3/2002 Savagle et al. ................. 604/28
2004/0069067 A1* 4/2004 Mancinone et al. .......... 73/653

* cited by examiner

*Primary Examiner*—Max Noori
(74) *Attorney, Agent, or Firm*—Black Lowe & Graham PL

(57) ABSTRACT

A strain gage sensor having improved operational aspects and lower production costs. The strain gage sensor includes two active resistors, two passive resistors, and a structure for minimizing strain experienced by the two passive resistors. The active and passive resistors are attached in a Wheatstone bridge configuration and are Piezoresistors. The active resistors and the strain minimizing structures are mounted on the backing plate. The backing plate or the strain minimizing structure includes alumina ceramic substrate. A voltage to current converter circuit is attached to the active and passive resistors and mounted to the backing plate. Multiple Wheatstone bridge circuits or multiple Wheatstone bridge circuits with voltage to current converter circuits are manufactured on a single backing plate and separated prior to use.

18 Claims, 4 Drawing Sheets

THICK FILM STRAIN GAGE SENSOR

FIELD OF THE INVENTION

This invention relates generally to force sensors and, more particularly, to strain gage sensors.

BACKGROUND OF THE INVENTION

Metal foil strain gage sensors, when applied to an object, can adequately measure straining forces on the object by determining how much the resistance of the resistors change within the metal foil strain gage sensor. A typical metal foil strain gage sensor includes four active resistors and thus four hard wire connections to the resistors. Because of the numerous wires extending from the metal foil strain gage sensor and its low signal to noise ratio, this type of sensor is susceptible to electromagnetic interference (EMI). Alternative strain gage technologies (thick film and semi-conductor) supply a higher signal to noise ratio, but have not traditionally been used due to their inability to measure axial and transverse strains with four active resistors.

Therefore, there exists a need for a strain gage sensor that is less susceptible to EMI/EMC while having an increased signal to noise ratio and an increased ability to measure multi-directional straining forces on an object.

SUMMARY OF THE INVENTION

The present invention is a strain gage sensor having improved operational aspects and lower production costs. The strain gage sensor includes two active resistors, two passive resistors, and a structure for minimizing strain experienced by the two passive resistors.

The active and passive resistors are attached in a Wheatstone bridge configuration and are Piezoresistors. The active resistors and the strain minimizing structures are mounted on the backing plate.

In accordance with further aspects of the invention, the backing plate or the stress minimizing structure includes aluminum ceramic substrate.

In accordance with further aspects of the invention, the backing plate or the stress minimizing structure includes alumina ceramic substrate.

In accordance with still further aspects of the invention, multiple Wheatstone bridge circuits or multiple Wheatstone bridge circuits with voltage to current converter circuits are manufactured on a single backing plate and separated prior to use.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
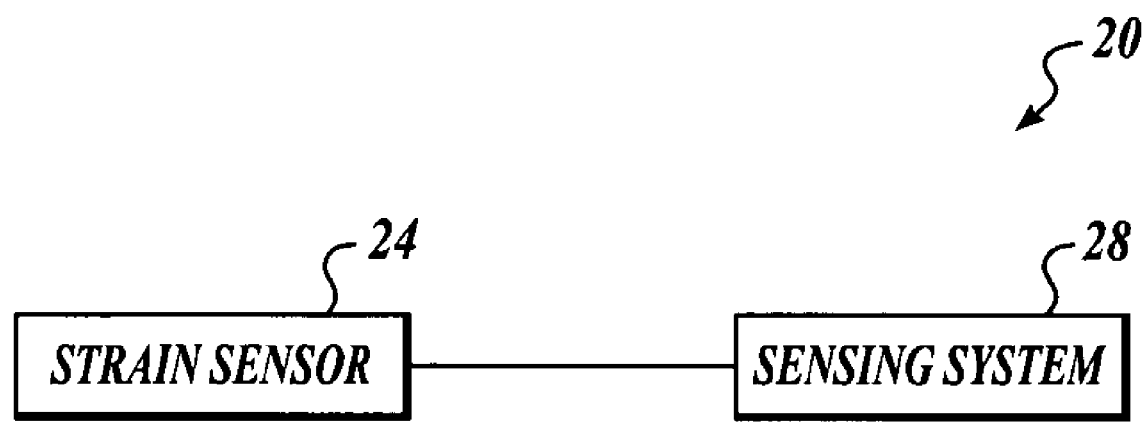
FIG. 1 illustrates a block diagram of a system formed in accordance with the present invention.

The present invention is a strain sensing system, such as the system 20 shown in FIG. 1, for supplying greater strain sensitivity than traditional metal foil strain gages with the ability to sense bi-directional strains while being produced by a more cost effective manufacturing method. The system 20 includes a strain sensor 24 in electrical communication with a sensing system 28. The strain sensor 24 is coupled to an object for sensing straining forces experienced by the object. The strain sensor 24 produces an electrical signal that is used by the sensing system 28 for identifying the strain force on the object and presenting the identified force to an observer.

Figure 2:
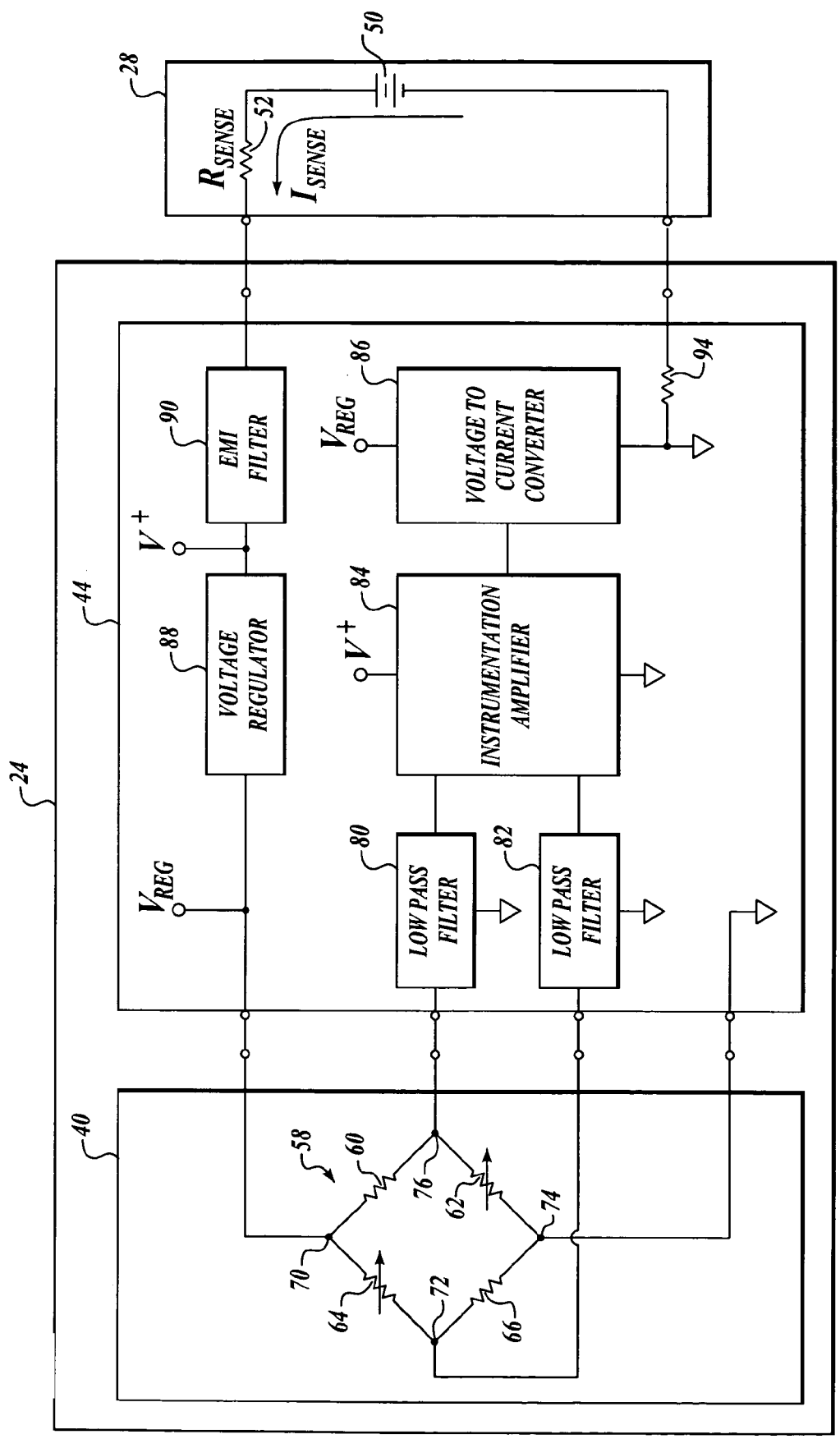
FIG. 2 is a circuit diagram of components of the system shown in FIG. 1.

As shown in FIG. 2, the strain sensor 24 includes a thick film strain sensor 40 that is in electrical communication with a signal conditioning circuit 44. The sensing system 28 includes a voltage source 50 and a sensing resistor 52 coupled across two leads from the signal conditioning circuit 44. In another embodiment the sensing system 28 includes circuitry or computer components for analyzing the voltage drop across the sensing resistor 52 to determine a strain force applied to an object with the attached thick film strain sensor 40. The sensing system 28 may also include components for storing the determined strain force or presenting the determined strain force to an operator.

The thick film strain sensor 40 includes a Wheatstone bridge circuit 58 having a first passive resistor 60 coupled at a first end to one end of a first active resistor 62 (connection point 76) and at a second end to a first end of a second active resistor 64 (connection point 70). The Wheatstone bridge circuit 58 also includes a second passive resistor 66 attached between second ends of the first and second active resistor 62 and 64 at connection points 74 and 72, respectively. The connection points 70–76 are electrically coupled to the signal conditioning circuit 44.

The signal conditioning circuit 44 includes first and second low pass filters 80 and 82, an instrumentation amplifier 84, a voltage to current converter 86, a voltage regulator 88, and an electro magnetic interference (EMI) filter 90. The connection point 76 is electrically coupled to the first low pass filter 80 and the connection point 72 is electrically coupled to the second low pass filter 82. The first and second low pass filters 80 and 82 output to the instrumentation amplifier 84. The instrumentation amplifier 84 takes the difference between results of the first and second low pass filters 80 and 82, amplifies the difference and outputs the amplified difference to the voltage to current converter 86. The voltage to current converter 86 converts the amplified voltage differential into a current and supplies the converted current through a resistor 94 to the voltage source 50 of the sensing system 28. The connection point 76 of the Wheatstone bridge circuit 58 is electrically connected to ground. The sensing resistor 52 of the sensing system 28 is electrically coupled to an input of the EMI filter 90. An output of the EMI filter 90 is electrically coupled to an input of the voltage regulator 88 and the output of the voltage regulator 88 is electrically coupled to the connection point 70 of the Wheatstone bridge circuit 58.

As the object that the thick film strain sensor 40 is attached to experiences a straining force, the active resistors 62 and 64 change in resistance, while the passive resistors do not. The voltage corresponding to the first active resistor 62 is filtered by the first low passive filter 80 in order to screen noise and EMI. The second low pass filter 82 performs the same task as the first low pass filter 80 but performs it on the voltage corresponding to the second active resistor 64. The instrumentation amplifier 84 takes the difference of the filtered voltages relative to the first and second active resistor 62 and 64 and amplifies that difference. The voltage to current converter 86 converts the amplified voltage differential into a current value that is passed through the resistor 94 to the sensing system 28. The sensing system 28 produces a sensing current based on the converted current received from the voltage to current converter 86 and produces a voltage drop across the sensing resistor 52 which thus becomes a sensing voltage value. The sensing voltage value is analyzed to determine the strain force experienced by the Wheatstone bridge circuit 58.

The voltage source 50 supplies a DC voltage to the EMI filter 90 based on the sensing current. The EMI filter 90 removes anomalies from the received voltage that might be produced by the voltage source 50 and sends the result to the voltage regulator 88. The voltage regulator 88 outputs a regulated voltage to the thick film strain sensor 40 at the connection point 70 of the Wheatstone bridge circuit 58.

Figure 3:
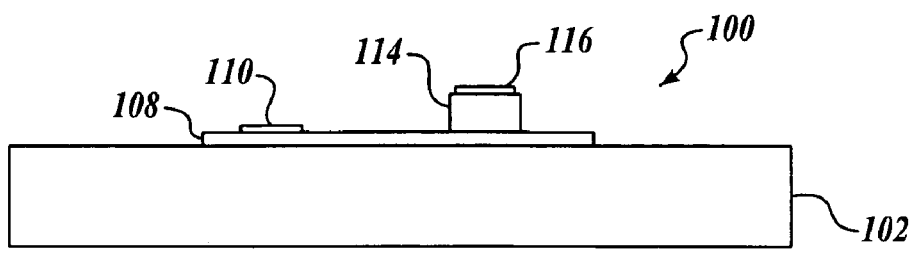
FIG. 3 illustrates a side view of a thick film strain sensor formed in accordance with the present invention.

As shown in FIG. 3, a cross-sectional view of a thick film strain sensor 100 mounted onto a structure 102 is shown. The thick film strain sensor 100 includes a sensor backing plate 108 that is a treated specialty steel backing plate, or an alumina ceramic substrate. Two active thin film Piezoresistors 110 are deposited onto the sensor backing plate 108. A resistor carrier material 114, such as an alumina carrier, is also attached to the sensor backing plate 108. Two passive thick film Piezoresistors 116 are deposited onto the resistor carrier material 114. The resistor carrier material 114 isolates the passive Piezoresistors 116 and virtually eliminates any change in their resistance due to a stress applied to the structure 102. In one embodiment, each passive resistor 116 is deposited onto a separate resistor carrier material 114 or onto a single piece of carrier material 114. The Piezoresistors 116 may be mounted onto other stress minimizing structures. The sensor backing plate 108 is attached to the structure 102 with a strain gage adhesive.

The resistor carrier material 114 is thermally conductive thus allowing both the active and passive resistors to operate at the same temperature and do not experience thermal gradients that would deteriorate accuracy. In order to ensure accurate thermal performance, thermal compensation between the active and passive resistors 110 and 116, the active and passive resistors 110 and 116 are doped to different temperature coefficient of resistance (TCR) values. The different TCR values are to ensure that thermal growth and shrinkage of the structure 102 does not produce an induced strain as sensed by the sensing resistor. Almost every type of structure 102 grows or shrinks with temperature, and that dimensional change appears to the active resistors to be the same as growth or compression from a load being applied to the structure 102. By keeping the passive Piezoresistors 116 at a different TCR than the active Piezoresistors 110, the passive Piezoresistors 116 can change as much as the active Piezoresistors 110 change from their own TCRs plus the induced strain of the structure 102 being measured. Equation 1 shows this:

$$\text{Thermal Differential Output} = \{\text{active}(TCR) + \text{induced strain}\} - \text{passive}(TCR) \cong 0 \text{ volts} \quad (1)$$

As stress is applied to the structure 102 and thus to the sensor backing plate 108, the active Piezoresistors 110 change in resistance causing a voltage differential between the active Piezoresistors 110. The voltage differential is directly proportional to the force applied on the structure 102.

Figure 4:
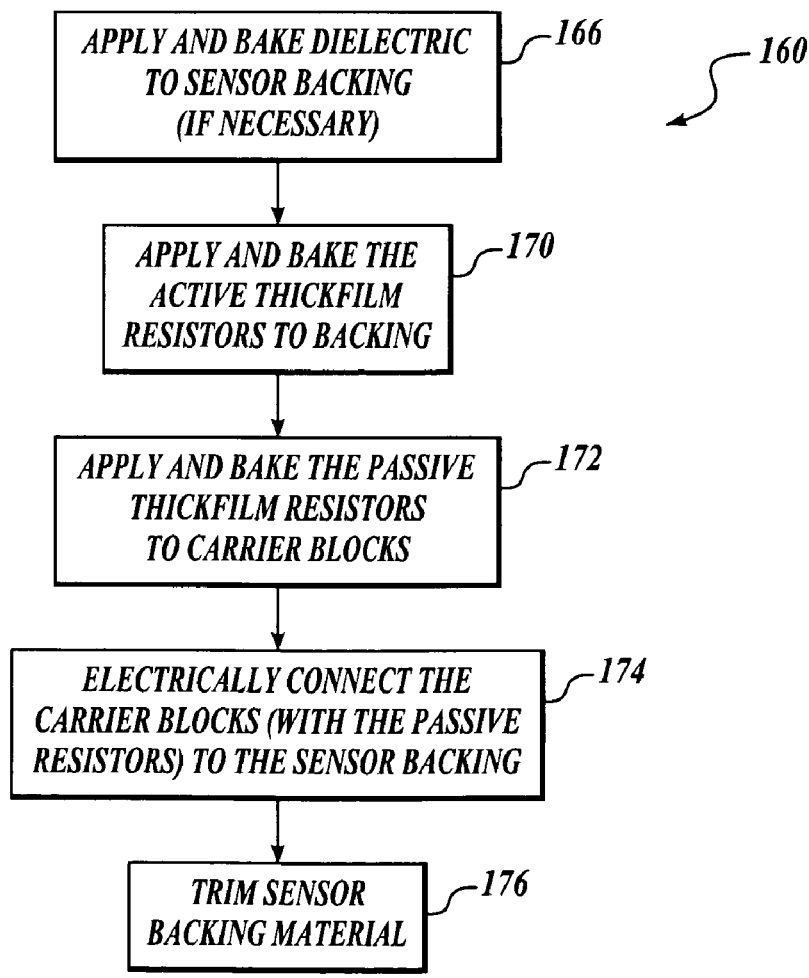
FIG. 4 illustrates a process for creating the thick film strain sensor shown in FIG. 3.

FIG. 4 illustrates an example process 160 for generating the strain sensor 100. At block 166, a dielectric material is applied and baked to the sensor backing plate 108. The dielectric is necessary for steel backing materials, but not for alumina backings. At a block 170, the active thick film Piezoresistors 110 are applied and baked onto the sensor backing plate 108. At a block 172, two passive thick film Piezoresistors 116 are applied and baked to resistor carrier material 114. At a block 174, the active and passive Piezoresistors 110 and 116 are electrically connected to circuitry on the sensor backing plate 108. The electrical connection of the passive resistors also mechanically attaches the carriers to the backing material.

The process 160 preferably uses a ceramic-on-metal process for fabricating the thick film Piezoresistors 110 and 116 onto the backing plate 108. An example ceramic-on-metal process is performed by Honeywell, Inc. At a block 176, the sensor backing plate 108 is trimmed to the desired size using either laser scribing, photo chemical etching, or a similar process. The goal is to fabricate the backing to the proper dimensions.

In one embodiment, a glass material is applied to the strain sensor 100 for environmentally protecting the sensor 100.

Figure 5:
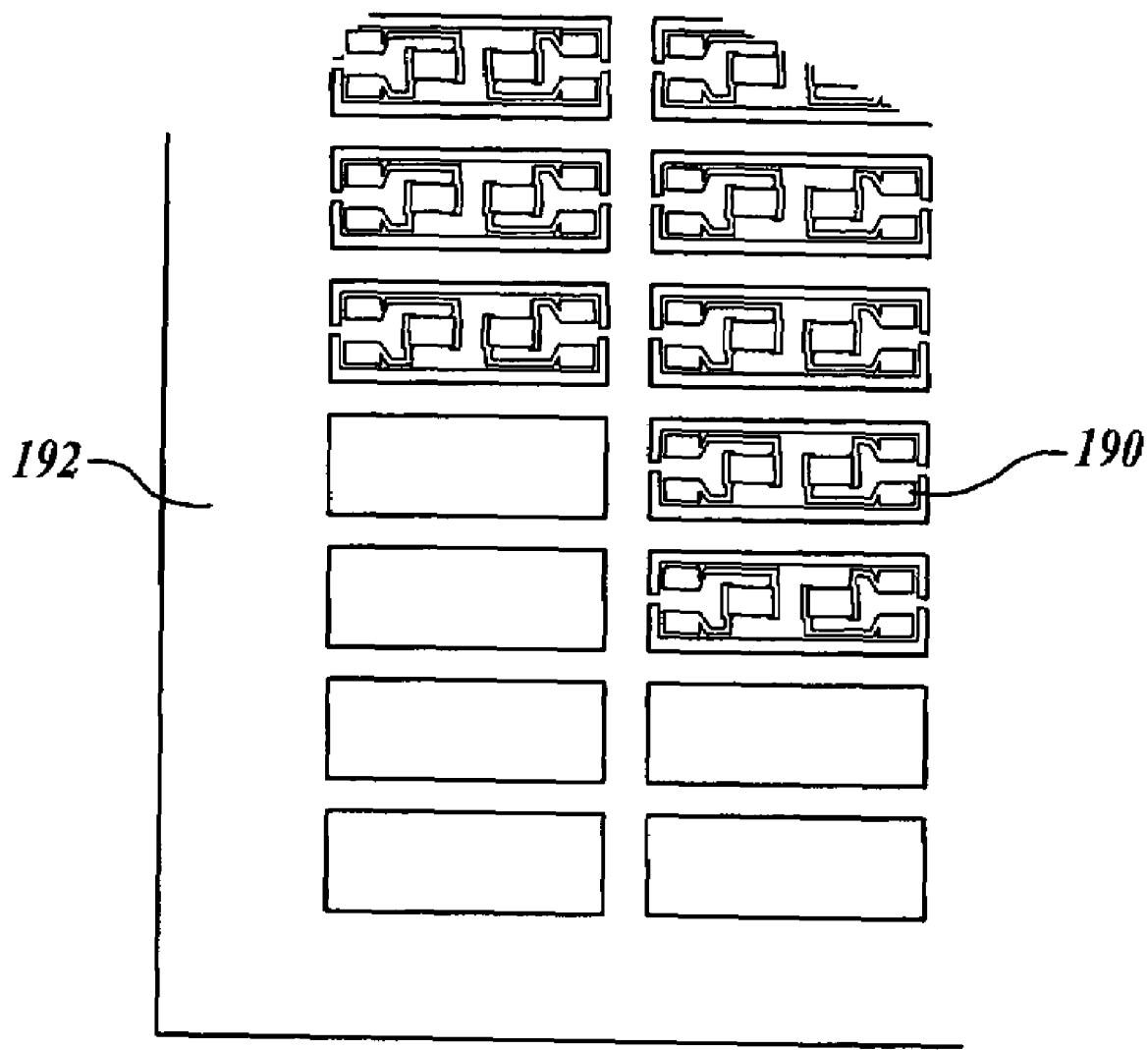
FIG. 5 is a perspective view of a plurality of components formed in accordance with an embodiment of the present invention.

FIG. 5 illustrates a plurality of sensors 190 that are formed on a single piece of backing plate 192, thereby allowing the sensors 190 to be manufactured at a low cost. Each sensor 190 is removed from the array prior to bonding to a structure that is to be measured for stress or strain.

In another embodiment, the circuitry of the signal conditioning circuit 44 is applied to the same sensor backing plate that includes the thick film strain sensor 40. By placing the circuitry of the thick film resistors 40 and the signal conditioning circuit 44, only the two leads of the signal conditioning circuit 44 are exposed.

Further circuitry can be included to add a wireless transponder capability. The addition of wireless transponder circuitry to the backing would eliminate the need for any wires to be connected to the sensor. The sensor would receive its power from a radiated signal and would in turn transmit a radiated signal containing the strain information. This circuitry would be different than the one depicted in FIG. 2.

While the preferred embodiment of the invention has been illustrated and described, as noted above, many changes can be made without departing from the spirit and scope of the invention. For example, steps in the process 160 may be performed in various order without departing from the scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A strain sensor device comprising:
   two active resistors;
   two passive resistors;
   one or more strain minimizing structures connected to the two passive resistors for minimizing strain experienced by the two passive resistors; and,
   a backing plate,
   wherein the active resistors and the one or more strain minimizing structures are mounted on the backing plate.

2. The device of claim 1, wherein the active and passive resistors are selected based on thermal properties of a structure that the device is to be attached.

3. The device of claim 1, wherein the active and passive resistors are attached in a Wheatstone bridge configuration.

4. The device of claim 3, wherein the active and passive resistors are Piezoresistors.

5. The device of claim 1, further comprising a voltage to current converter mounted to the backing plate.

6. The device of claim 1, wherein the backing plate includes alumina (aluminum oxide) ceramic substrate.

7. The device of claim 6, wherein the one or more strain minimizing structures include alumina ceramic substrate.

8. The device of claim 1, wherein the backing plate is bonded to a structure using an adhesive.

9. A method of making a strain sensor, the method comprising:
   a) applying two active resistors to a backing plate;
   b) applying a strain suppression device to the backing plate;
   c) applying two passive resistors to the strain suppression device;
   d) electrically connecting the applied active and passive resistors to form a strain gage sensor.

10. The method of claim 9, wherein the strain suppression device includes alumina ceramic substrate.

11. The method of claim 9, further comprising bonding the backing plate to an object using a strain gage adhesive.

12. The method of claim 9, further comprising:
   repeating a–d for producing a plurality of strain gage sensors on the backing plate.

13. The method of claim 9, further comprising:
   e) attaching a current to voltage converter circuit to the strain gage sensor on the backing plate; and
   f) providing two leads electrically coupled to the current to voltage converter circuit for producing a sensing circuit.

14. The method of claim 13, further comprising:
   repeating a–f for producing a plurality of sensing circuits on the backing plate.

15. The method of claim 9, wherein at least one of the resistors is a Piezoresistor.

16. The method of claim 9, further comprising:
   doping the resistors to have coefficient of resistance values for minimizing the effects of thermal properties of a target object.

17. The method of claim 9, wherein d includes attaching the resistors in a Wheatstone bridge configuration.

18. The method of claim 9, wherein the backing plate includes alumina ceramic substrate.

* * * * *